US009228721B2

(12) United States Patent
Hesch, Jr. et al.

(10) Patent No.: US 9,228,721 B2
(45) Date of Patent: Jan. 5, 2016

(54) LED PAPI WITH CONDENSATION PROTECTION

(71) Applicant: ADB Airfield Solutions, Columbus, OH (US)

(72) Inventors: John Hesch, Jr., Orient, OH (US); David L. Ruffini, Pickerington, OH (US); Glenn Alan Morrow, Westerville, OH (US); Richard Schweder, Powell, OH (US)

(73) Assignee: ADB Airfield Solutions, Columbus, OH (US)

(*) Notice: Subject to any disclaimer, the term of this patent is extended or adjusted under 35 U.S.C. 154(b) by 276 days.

(21) Appl. No.: 13/916,340

(22) Filed: Jun. 12, 2013

(65) Prior Publication Data

US 2013/0334984 A1 Dec. 19, 2013

Related U.S. Application Data

(60) Provisional application No. 61/659,061, filed on Jun. 13, 2012.

(51) Int. Cl.

| | |
|---|---|
| ***H05B 33/08*** | (2006.01) |
| ***F21V 15/01*** | (2006.01) |
| ***H05B 37/02*** | (2006.01) |
| ***B64F 1/20*** | (2006.01) |
| ***F21V 31/00*** | (2006.01) |

(52) U.S. Cl.

CPC . *F21V 15/01* (2013.01); *B64F 1/20* (2013.01); *F21V 31/005* (2013.01); *H05B 33/0842* (2013.01); *H05B 33/0893* (2013.01); *H05B 37/02* (2013.01); *B64D 2203/00* (2013.01); *Y02B 20/341* (2013.01)

(58) Field of Classification Search

CPC ..... F21V 15/01; H05B 33/0842; G08G 5/025

USPC ........... 362/135, 231, 276, 293; 315/152, 136

See application file for complete search history.

(56) References Cited

U.S. PATENT DOCUMENTS

| | | | | |
|---|---|---|---|---|
| 5,029,051 | A | 7/1991 | Shirai et al. | |
| 5,154,507 | A * | 10/1992 | Collins | 362/218 |
| 5,724,187 | A | 3/1998 | Varaprasad et al. | |
| 2006/0150817 | A1 | 7/2006 | DeGuiseppi et al. | |
| 2010/0033966 | A1* | 2/2010 | Laenen et al. | 362/235 |
| 2011/0155713 | A1* | 6/2011 | Wang et al. | 219/203 |

FOREIGN PATENT DOCUMENTS

| | | | |
|---|---|---|---|
| WO | WO2007/042492 | A1 | 4/2007 |

* cited by examiner

*Primary Examiner* — Dinh Le

(74) *Attorney, Agent, or Firm* — Black McCuskey Souers & Arbaugh, LPA

(57) ABSTRACT

In accordance with an example embodiment, there is disclosed herein a LED PAPI (10) with condensation protection. The condensation protection may suitably comprise passive components, such as gaskets and seals (26, 36) and a desiccant (48), and/or active components, such as a defroster (39) and/or a heater (50).

13 Claims, 6 Drawing Sheets

16 38 36 22 44 46 46 39 46 46

LED PAPI WITH CONDENSATION PROTECTION

CROSS REFERENCE TO RELATED APPLICATIONS

This application claims the benefit of U.S. Provisional Application No. 61/659,061, filed Jun. 13, 2012.

TECHNICAL FIELD

The present disclosure relates generally to a Precision Approach Path Indicator (PAPI) implemented using Light Emitting Diodes (LEDs).

BACKGROUND

The Precision Approach Path Indicator (PAPI) system, as described in the FAA's "Precision Approach Path Indicator (PAPI) Systems" in FAA Advisory Circular AC 150/5345-28F, dated Apr. 12, 2005 provides a visual aid for pilots when landing an aircraft. The type of PAPI may be either a system consisting of 4 light units (L-880) or a system consisting of 2 light units (L-881). The light units are placed on one side of the runway in a line perpendicular to the runway centerline to define the visual glide path angle. The light units each have a white segment in an upper part of the beam and red segment in a lower part of the beam. The lights are positioned and aimed to produce a visual presentation wherein a pilot on or close to the established approach path (center) can determine his position relative of the glide path angle based on the colors of the lights as observed by the pilot.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
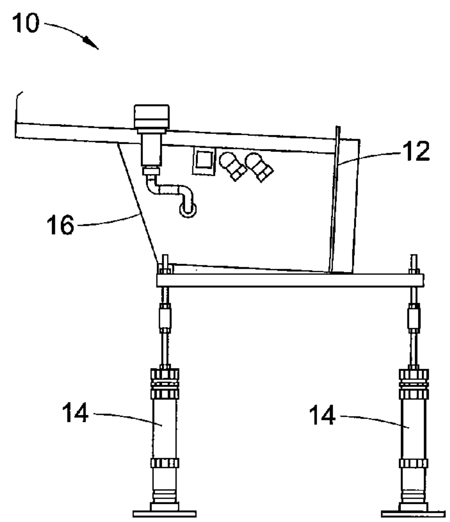
FIG. 1 illustrates a side view of a LED PAPI in accordance with an example embodiment.
Figure 2:
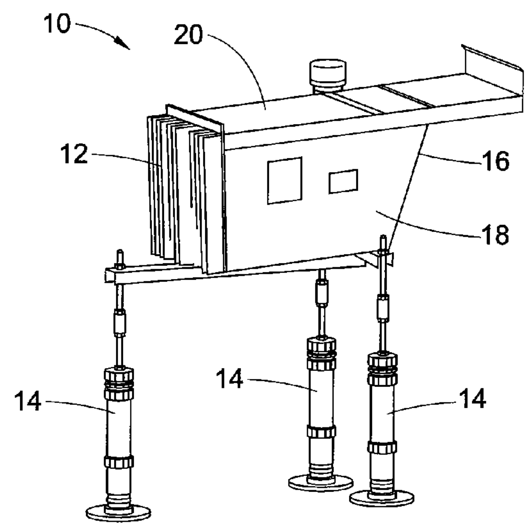
FIG. 2 illustrates a side view that is the opposite side of the side in FIG. 1.
Figure 3:
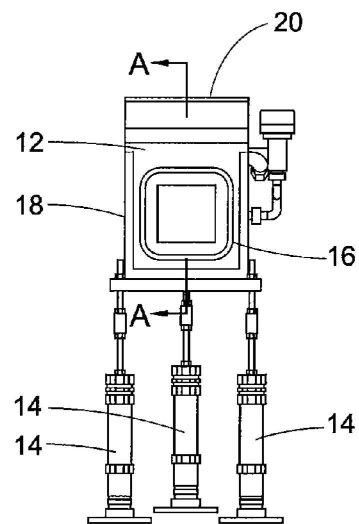
FIG. 3 illustrates a front view of the LED PAPI shown in FIGS. 1 and 2.
Figure 4:
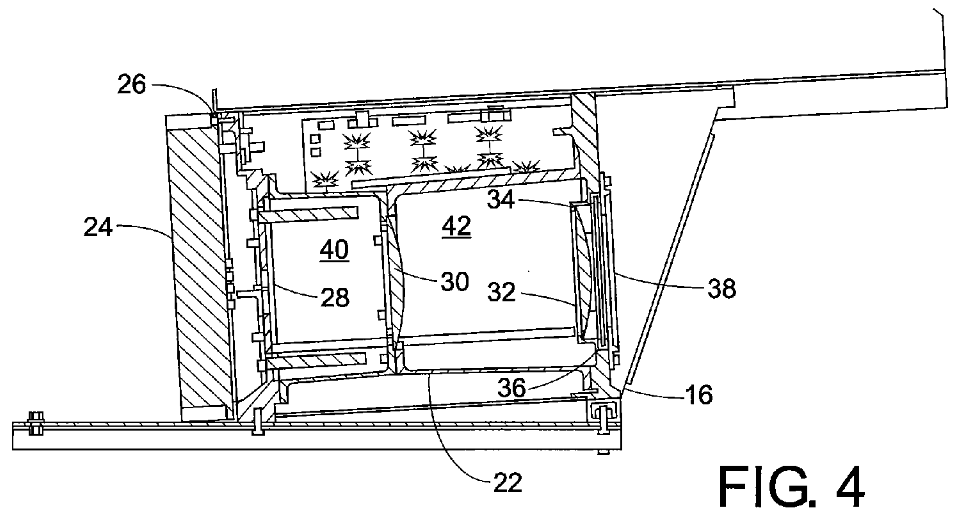
FIG. 4 is a cutaway view of the LED PAPI of FIGS. 1-3 taken along the axis A-A in FIG. 3.
Figure 5:
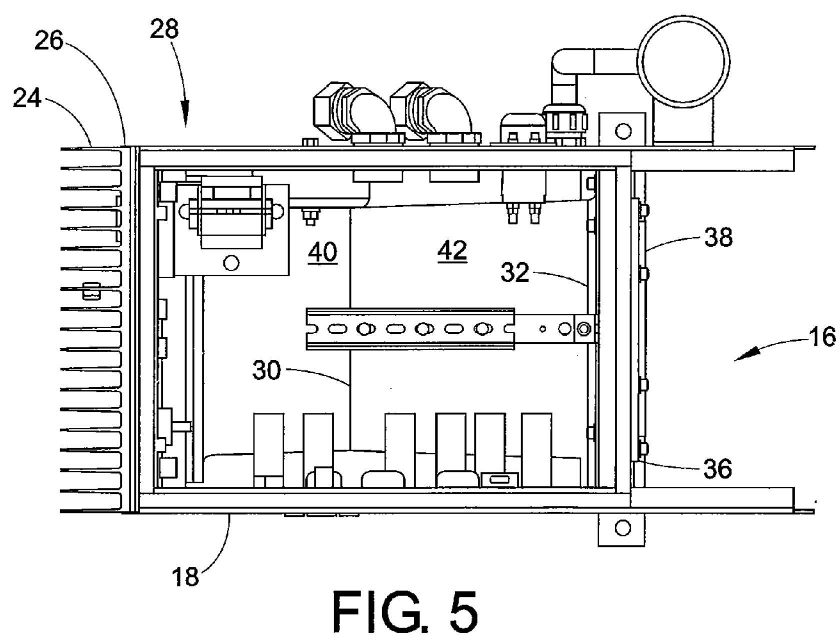
FIG. 5 is a view of the inside of the LED PAPI of FIGS. 1-4 with the top cover removed.
Figure 6:
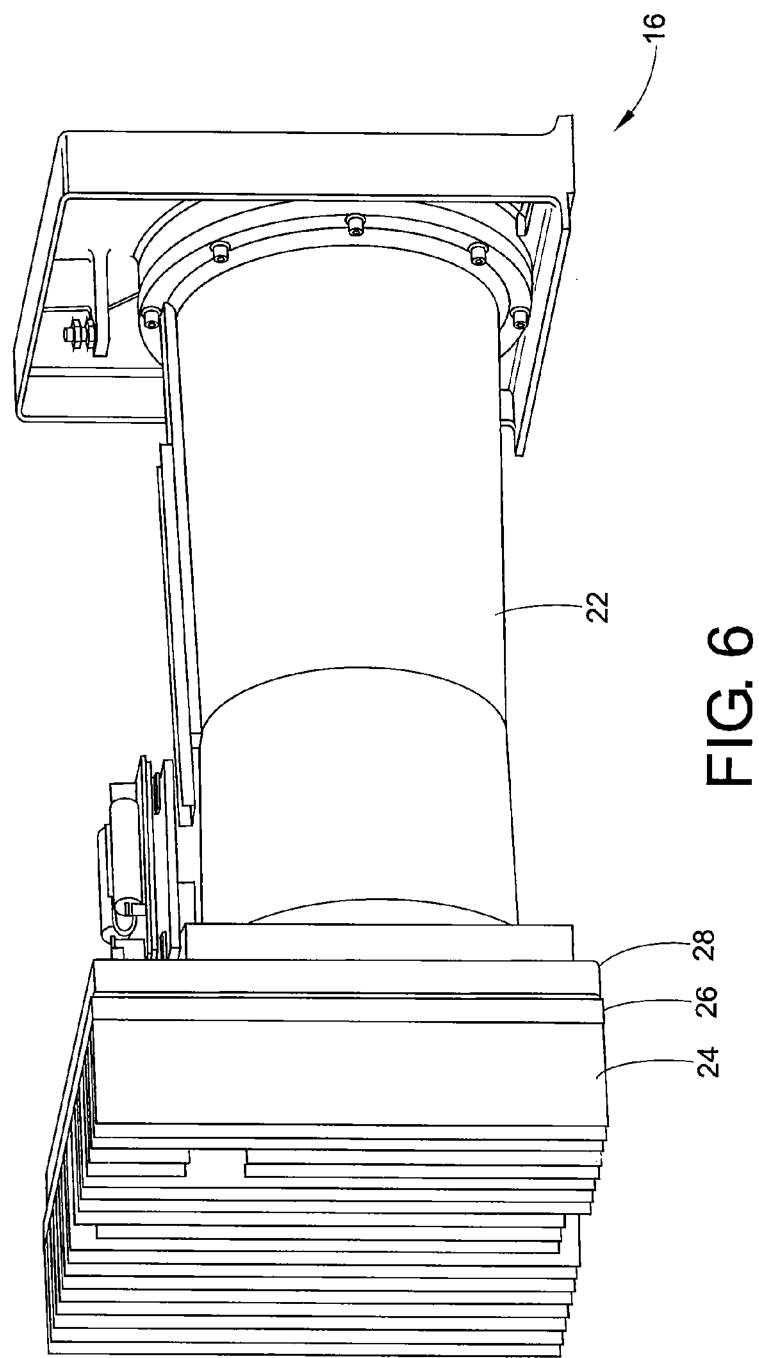
FIG. 6 illustrates an example of a light assembly for the LED PAPI of FIGS. 1-5.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Referring to FIGS. 1-6, there is illustrated an LED PAPI 10 in accordance with an example embodiment. The LED PAPI 10 comprises a chassis 12 and legs 14 coupled with the chassis for elevating the chassis above ground. The chassis comprises a side panel 18 and a top panel 20. In operation, light generated within the chassis exits the LED PAPI 10 out of or through the front side 16 of the LED PAPI 10.

Figure 9:
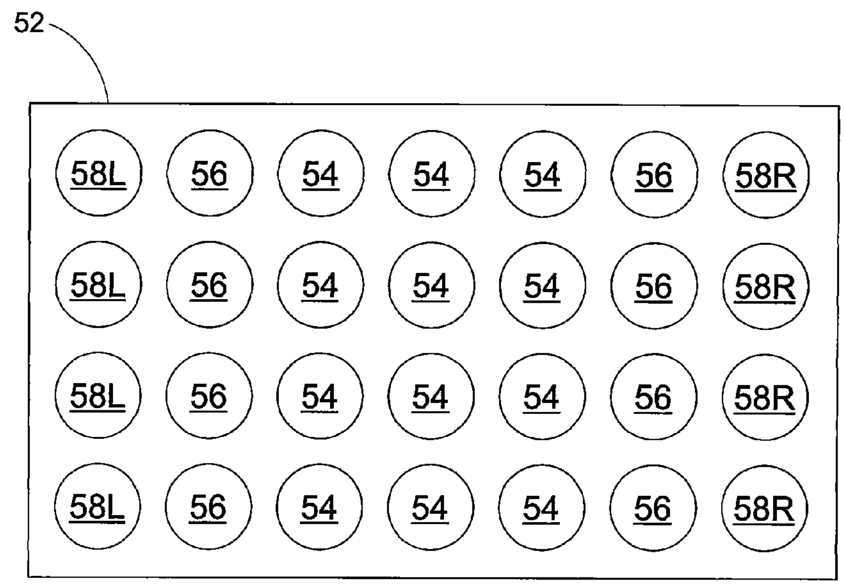
FIG. 9 illustrates an example of a LED array for the LED PAPI of FIGS. 1-8.

The LED PAPI 10 comprises a light assembly 22. As will be explained in more detail herein, the light assembly 22 is sealed to prevent moisture from entering the light assembly 22 to protect against condensation. In an embodiment, the light assembly 22 is preferably hermetically sealed. The light assembly 22 comprises a heat sink 24 coupled with a light source 28, such as a LED array 52 (FIG. 9). A seal 26 prevents moisture from entering the light assembly 22 between the heat sink 24 and the light source 28. In particular embodiments, any wiring to the light source 28 passes through seal 26 and is thereby sealed to prevent moisture from entering the interior of light assembly 22.

The light assembly 22 comprises two convex lenses 30 and 32. The second lens 32 is mounted in mount 34. A seal 36 is held in place by cover 38. The seal 36 prevents moisture from reaching convex lens 32. The light assembly 22 further comprises two areas 40 and 42. The first area 40 in the light assembly 22 is located between the light source 28 and the first convex lens 30. A second area 42 in the light assembly 22 is located between first convex lens 30 and second convex lens 32.

Figure 7:
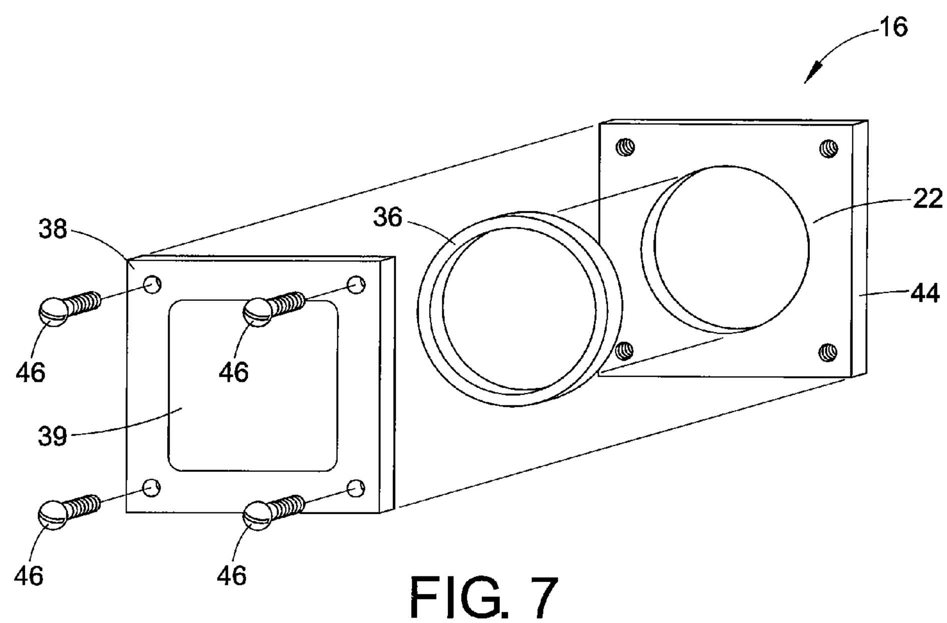
FIG. 7 is an exploded view of the front side of the LED PAPI of FIGS. 1-6.

Referring to FIG. 7 with continued reference to FIGS. 1-6, there is illustrated an exploded view of the front side 16 of the LED PAPI 10. As can be observed from the illustrated example, the seal (or gasket) 36 is held onto flange 44 by cover 38. Cover 38 can be made of a translucent material such as glass or clear plastic. Fasteners 46 hold cover 38 onto the flange 44.

In an example embodiment, the cover 38 comprises a defroster 39. Any suitable defroster 39 may be employed for the cover 38. For example, wires may be inserted into cover 38 for defrosting, or a resistance heater can be used to heat the area between front glass 38 and front lens 32. As another example, the cover 38 may be coated with an Indium Tin Oxide (ITO). A voltage applied to wires and/or the ITO coating will generate heat helping to defrost cover 38.

Figure 8:
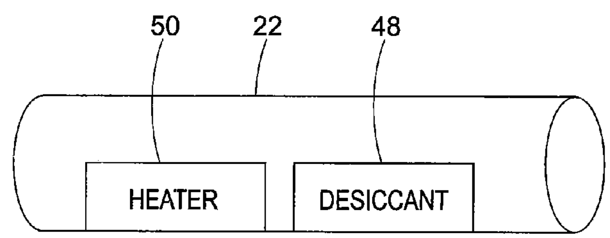
FIG. 8 illustrates an example of a light assembly with a desiccant and a heater for use in the LED PAPI of FIGS. 1-7.

Referring to FIG. 8 with continued reference to FIGS. 1-7, there is illustrated an example of a light assembly 22 with a desiccant 48 and a heater 50. The desiccant 48 and/or heater 50 may be mounted in first area 40 and/or second area 42 of light assembly 22. In that way, the desiccant 48 and/or heater 50 are hermetically sealed within the light assembly together with the light source 28. However, as seals 26 and 36 age, they may allow some air in. In an example embodiment, desiccant 48 is employed, wherein the desiccant absorbs any moisture in the air that enters the light assembly 22. Also in the example embodiment, a heater 50 is employed for selectively periodically burning off any moisture collected in desiccant 48 as necessary or desired. In particular embodiments, the interior of light assembly 22 may be filled with an inert gas to prevent moisture from entering the interior of light assembly 22. Also in particular embodiments, during manufacture, the interior of light assembly 22 is evacuated of all gasses, then filled with an inert gas to prevent moisture from entering the interior of light assembly 22. In particular embodiments, a chemical desiccant may be employed to reconstitute seals 26 and 36 so that seals 26 and 36 may be reused for many thermal and humidity cycles.

FIG. 9 illustrates an example of a LED array 52 for the LED PAPI 10. The LED array 52 comprises three groups (or strings) of LED's labeled 54, 56, and 58 respectively. In the illustrated example, the location of a failed LED relative to the overall LED array 52 may determine whether the LED PAPI will switch on. For example, the FAA requires that if an LED PAPI cannot meet certain photometric requirements, the LED PAPI should not switch on. In accordance with an example embodiment, the location of a failed LED may determine whether the LED will function. For example, for the first group (or string) of LED's, labeled 54, if any one LED fails, then the LED PAPI is determined by a controller of the system to be described below, to be in a state of out of service. For the second group (or string) of LED's, labeled 56, the failure of a single LED will not incapacitate the LED PAPI 10. The third group or string of LED's are labeled 58R and 58L for right and left side respectively. In accordance with an example embodiment, a single LED failure on either one of 58R and/or 58L will not incapacitate the LED PAPI 10. In particular embodiments, multiple LED failures may be tolerated as long as the failures are symmetrical. For example, the failure of multiple LEDs in string 58R may be tolerated if the same, or similar, number of LEDs have failed in string 58L.

Figure 10:
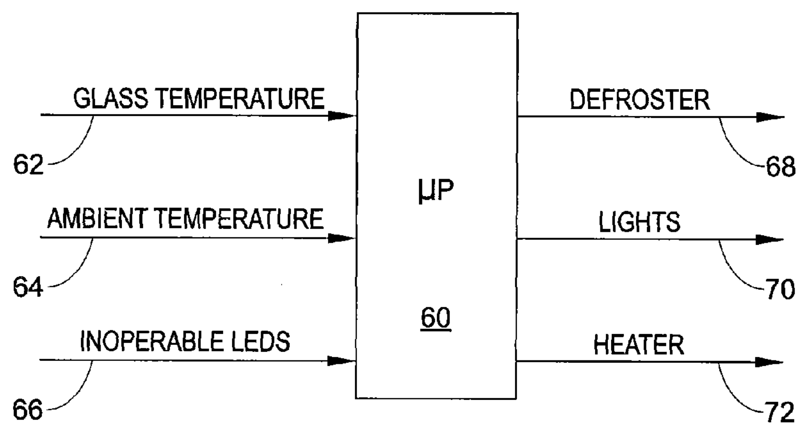
FIG. 10 illustrates an example of a controller for the LED PAPI of FIGS. 1-9.

FIG. 10 illustrates an example of a controller 60 for a LED PAPI. The controller may suitably comprise logic for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an example embodiment, the controller 60 may suitably obtain inputs for Glass Temperature (the temperature of cover 38) from a glass temperature sensor (not shown) generating a Glass Temperature signal 62 input into the controller, an ambient air temperature (outside of light assembly 22) input from an ambient air temperature sensor (not shown) generating an ambient air temperature signal 64 input into the controller, and an indication of inoperable LEDs of the LED array 52 from one or more suitable sensors generating an inoperable LED signal 66 input into the controller.

Based on the inputs, the controller 60 is configured to determine the one or more control action(s) for the operation of the defroster and thereby control the action of the defroster by generating a defroster control output signal which is indicated by 68 and/or the control action for the operation of the lights (or LEDs) of the LED array 52 by generating an LED control output signal as indicated by 70. In particular embodiments, if a heater is installed (e.g., heater 50 in FIG. 8), the controller is configured to control the operation of the heater by generating a heater control output signal as illustrated by 72.

For example, in the event of a power failure, a LED PAPI may be unable to switch the lights on for a predefined time period (e.g., 3 minutes) after the defroster 39 has commenced operation to ensure frost (e.g., on cover 38 in FIG. 8) does not adversely affect the photometrics. However, because controller 60 receives input signals 62, 64 indicating the glass temperature and ambient air temperature respectively, the controller 60 is aware of the current conditions and can determine whether the lights can be switched on earlier.

In particular embodiments, the defroster 39 can be operated when the lights are switched off, so when the lights are needed, they may be switched on immediately ("instant on") without waiting to defrost the LED PAPI. Moreover, because LED's are very efficient and do not produce as much heat as conventional incandescent light bulbs, controller 60 may also switch on the defroster 39 while the lights are on.

Figure 11:
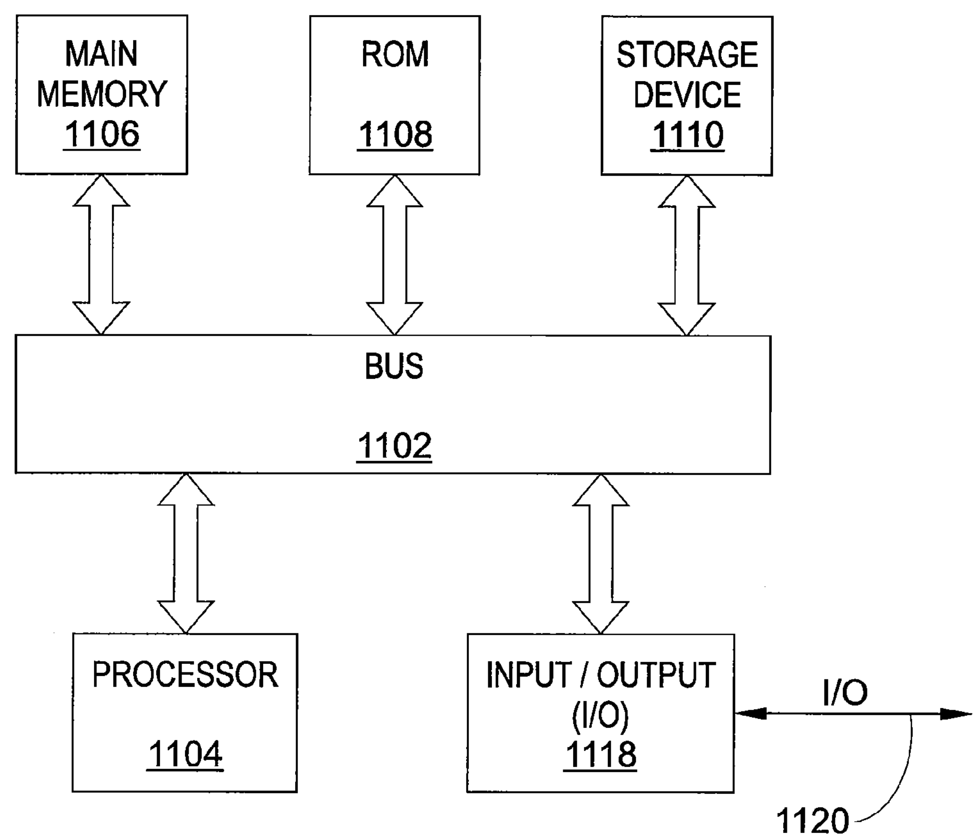
FIG. 11 illustrates an example of a computer system upon which an example embodiment LED PAPI can be implemented.

FIG. 11 illustrates an example of a computer system 1100 upon which an example embodiment can be implemented. Computer system 1100 is suitable for implementing the functionality of controller 60 (FIG. 10).

Computer system 1100 includes a bus 1102 or other communication mechanism for communicating information and a processor 1104 coupled with bus 1102 for processing information. Computer system 1100 also includes a main memory 1106, such as random access memory (RAM) or other dynamic storage device coupled to bus 1102 for storing information and instructions to be executed by processor 1104. Main memory 1106 also may be used for storing a temporary variable or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk, optical disk, and/or flash storage, is provided and coupled to bus 1102 for storing information and instructions.

An aspect of the example embodiment is related to the use of computer system 1100 for implementing a LED PAPI with condensation protection. According to an example embodiment, implementing a LED PAPI with condensation protection is provided by computer system 1100 in response to processor 1104 executing one or more sequences of one or more instructions contained in main memory 1106. Such instructions may be read into main memory 1106 from another computer-readable medium, such as storage device 1110. Execution of the sequence of instructions contained in main memory 1106 causes processor 1104 to perform the process steps described herein. One or more processors in a multi-processing arrangement may also be employed to execute the sequences of instructions contained in main memory 1106. In alternative embodiments, hard-wired circuitry may be used in place of or in combination with software instructions to implement an example embodiment.

Thus, embodiments described herein are not limited to any specific combination of hardware circuitry and software.

The term "computer-readable medium" as used herein, refers to any medium that participates in providing instructions to processor 1104 for execution. Such a medium may take many forms, including but not limited to non-volatile media, and volatile media. Non-volatile media include, for example, optical or magnetic disks, such as storage device 1110. Volatile media include dynamic memory such as main memory 1106. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD, flash drive or any other memory chip or cartridge, or any other medium from which a computer can read.

Computer system 1100 also includes an input/output (I/O) interface 1118 coupled to bus 1102. I/O interface 1118 provides a two-way data communication coupling computer system 1100 to a I/O 1120 that is connected to sensors, switches, and/or other appropriate control devices. These sensors, switches, and/or other appropriate control devices may include, for example, a glass temperature input signal 62, an ambient air temperature input signal 64, an inoperable LED input signal 66, a defroster control output signal 68, a light control output signal 70, and a heater control output signal 72.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. An apparatus (10), comprising:
a plurality of legs (14);
a chassis (12) mounted on the plurality of legs (14); and
a light assembly (22), the light assembly comprising a first surface at the first end of the light assembly (22) and a second surface at the second end of the light assembly (22), the light assembly (22) comprising:
a light source (28) disposed at the first end of the light assembly (22),
a first convex lens (32) disposed at the second end of the light assembly (22),
a second convex lens (30) disposed inside the light assembly (22) between the first convex lens (32) and the light source (28),
first seal (26) at the first end of the light assembly (22),
a second seal (36) at the second end of the light assembly (22),
a controller (60), and
a defroster (39);
wherein the controller (60) is operable to receive an first input (62) indicating a temperature of the first surface and a second input (64) indicating ambient air temperature; and
wherein the controller (60) operates the light source (28) and the defroster (39) based on the temperature of the first surface and the ambient air temperature.

2. The apparatus (10) set forth in claim 1, the second end of the light assembly further comprises:
a flange (44); and
a cover (38) that holds the second seal (36) against the flange (44).

3. The apparatus (10) set forth in claim 2, wherein the cover (38) is translucent.

4. The apparatus (10) set forth in claim 3, wherein the cover (38) is coated with Indium Tin Oxide.

5. The apparatus (10) set forth in claim 4, wherein a voltage is applied to the Indiun Tin Oxide coating to defrost the cover (38).

6. The apparatus (10) set forth in claim 1, wherein the light source (28) further comprises a heat sink (24).

7. The apparatus (10) set forth in claim 1, wherein the light source (28) comprises a light emitting diode array (52).

8. The apparatus (10) set forth in claim 7, wherein the light emitting diode array (52) comprises a plurality of groups (54, 65, 58L, 58R) having a plurality of light emitting diodes.

9. The apparatus (10) set forth in claim 8, wherein the controller is operative to, upon detecting a failure of a light belonging to a first group (54) of the plurality of groups, switch the light source (28) off.

10. The apparatus (10) set forth in claim 9, the controller (60) upon detecting a failure of a combination of at least one light emitting diode belonging to a second group of the plurality of groups and at least one light emitting diode belong to a third group of the plurality of groups is operable to switch the light source (28) off.

11. The apparatus (10) set forth in claim 1, wherein the controller (60) upon detecting power has been restored after a power failure, is operable to operate the defroster (39) for a predetermined time period before switching the light source on.

12. The apparatus (10) set forth in 1 the controller (60) operates the defroster (39) is while the light source (28) is switched off to allow the light source to be switched on instantly.

13. The apparatus (10) set forth in claim 1, the light assembly (22) further comprises a desiccant mounted in one of a group consisting of the first end and the second end.

* * * * *